United States Patent
Liu et al.

(10) Patent No.: US 12,375,153 B2
(45) Date of Patent: Jul. 29, 2025

(54) METHODS AND APPARATUSES FOR SPATIAL RESOURCE SELECTION

(71) Applicant: Telefonaktiebolaget LM Ericsson (publ), Stockholm (SE)

(72) Inventors: Yusheng Liu, Lund (SE); Xueying Hou, Lund (SE); Krister Edström, Hjärup (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 394 days.

(21) Appl. No.: 17/911,833

(22) PCT Filed: Mar. 20, 2020

(86) PCT No.: PCT/EP2020/057871
§ 371 (c)(1),
(2) Date: Sep. 15, 2022

(87) PCT Pub. No.: WO2021/185461
PCT Pub. Date: Sep. 23, 2021

(65) Prior Publication Data
US 2023/0134079 A1    May 4, 2023

(51) Int. Cl.
*H04W 72/543*    (2023.01)
*H04W 72/044*    (2023.01)
*H04W 72/50*    (2023.01)

(52) U.S. Cl.
CPC ....... *H04W 72/543* (2023.01); *H04W 72/046* (2013.01); *H04W 72/50* (2023.01)

(58) Field of Classification Search
CPC ..... H04W 72/00; H04W 72/50; H04W 72/54; H04W 72/543; H04W 72/04;
(Continued)

(56) References Cited

U.S. PATENT DOCUMENTS

| 10,439,702 B2 | 10/2019 | Skov et al. |
| 2018/0270717 A1 | 9/2018 | Kakishima et al. |

(Continued)

FOREIGN PATENT DOCUMENTS

| JP | 2012129811 A | 7/2012 |
| WO | 2020056180 A1 | 3/2020 |
| WO | 2021185461 A1 | 9/2021 |

OTHER PUBLICATIONS

Ericsson, "Maintenance of Rel.16 UL reference signals for NR positioning", 3GPP TSG-RAN WG1 Meeting #100e, RI-2001003, e-Meeting, Feb. 24-Mar. 6, 1-5.
(Continued)

*Primary Examiner* — Warner Wong
(74) *Attorney, Agent, or Firm* — Murphy, Bilak & homiller, PLLC

(57) ABSTRACT

A method is disclosed for spatial resource selection from a plurality of spatial resources. The method comprises—for each spatial resource of the plurality of spatial resources—receiving a plurality of reference signal blocks using the spatial resource (wherein at least some of the reference signal blocks are received in different frequency intervals and during different time intervals), determining (for each received reference signal block) whether or not a signal quality metric of the received reference signal block meets a quality criterion, and determining whether the spatial resource is to be considered for spatial resource selection based on the quality criterion determinations of the received reference signal blocks. The spatial resources may be beams of a beam-forming application, or antennas of a multi-antenna arrangement, or multiple-input multiple-output (MIMO) streams. The reference signal blocks may comprise one or more of uplink reference signals, sounding reference signals, demodulation reference signals, and phase tracking
(Continued)

reference signals. Corresponding apparatus, network node and computer program product are also disclosed.

14 Claims, 6 Drawing Sheets

(58) Field of Classification Search
CPC . H04W 72/044; H04W 72/046; H04W 28/00; H04W 28/26; H04W 72/02; H04W 72/51; H04B 7/15542
See application file for complete search history.

(56) References Cited

U.S. PATENT DOCUMENTS

| | | | |
|---|---|---|---|
| 2019/0109679 A1* | 4/2019 | Liu | H04L 5/0048 |
| 2020/0059896 A1* | 2/2020 | Xu | H04W 28/02 |
| 2020/0112872 A1* | 4/2020 | Nimbavikar | H04L 47/805 |
| 2020/0366430 A1 | 11/2020 | Yu et al. | |
| 2021/0266981 A1* | 8/2021 | Wei | H04W 72/04 |
| 2021/0329596 A1* | 10/2021 | Freda | H04W 72/02 |
| 2023/0232464 A1* | 7/2023 | Agiwal | H04W 56/001 370/329 |
| 2024/0089944 A1* | 3/2024 | Liu | H04W 72/542 |

OTHER PUBLICATIONS

Huawei, et al., "UL SRS design for beam management and CSI acquisition", 3GPP TSG RAN WG1 Meeting #90bis, R1-1717307, Prague Czech Republic, Oct. 9-13, 2017, 1-13.

Samsung, et al., "WF on Beam Correspondence", 3GPP TSG RAN WG1 Meeting #87, R1-1613542 (R1-1613682), Agenda item 7.1.3.3, Reno, USA, Nov. 14-18, 2016, 1-5.

Vivo, "Discussion on beam management for NR MIMO", 3GPP TSG RAN WG1 AH_NR Meeting, R1-1700274, Spokane, USA, Jan. 16-20, 2017, 1-7.

* cited by examiner

METHODS AND APPARATUSES FOR SPATIAL RESOURCE SELECTION

TECHNICAL FIELD

The present disclosure relates generally to the field of wireless communication. More particularly, it relates to selection of spatial resources for wireless communication.

BACKGROUND

When a wireless communication system utilizes the same, or overlapping, frequency ranges for communication in a first link direction (e.g., uplink, UL) and for communication in a second link direction (e.g., downlink, DL), channel conditions estimated based on reference signals communicated in the first link direction may be used to approximate channel conditions for communication in the second link direction. The approximate channel conditions for communication may then be used for spatial resource selection for transmission in the second link direction.

When the reference signals are transmitted in different frequency intervals—within the frequency range of the first link direction—at different time intervals (e.g., due to frequency hopping of the reference signals), the channel condition estimation becomes more cumbersome and the spatial resource selection may consequently become less accurate. For example, an unsuitable spatial resource may be selected and/or a suitable spatial resource may be improperly discarded from selection.

Therefore, there is a need for approaches to spatial resource selection in such scenarios.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for spatial resource selection from a plurality of spatial resources. The method comprises—for each spatial resource of the plurality of spatial resources—receiving a plurality of reference signal blocks using the spatial resource (wherein at least some of the reference signal blocks are received in different frequency intervals and during different time intervals), determining (for each received reference signal block) whether or not a signal quality metric of the received reference signal block meets a quality criterion, and determining whether the spatial resource is to be considered for spatial resource selection based on the quality criterion determinations of the received reference signal blocks.

In some embodiments, a selected spatial resource is to be used by a transmitter.

In some embodiments, determining whether the spatial resource is to be considered for spatial resource selection comprises determining that the spatial resource is to be considered for spatial resource selection when the quality criterion is met for the most recently received reference signal block.

In some embodiments, determining whether the spatial resource is to be considered for spatial resource selection comprises determining that the spatial resource is to be considered for spatial resource selection when the quality criterion is met for at least a first number of the plurality of received reference signal blocks.

In some embodiments, determining whether the spatial resource is to be considered for spatial resource selection comprises determining that the spatial resource is not to be considered for spatial resource selection when the quality criterion is not met for the most recently received reference signal block.

In some embodiments, determining whether the spatial resource is to be considered for spatial resource selection comprises determining that the spatial resource is not to be considered for spatial resource selection when the quality criterion is not met for at least a second number of the plurality of received reference signal blocks.

In some embodiments, determining whether the spatial resource is to be considered for spatial resource selection is further based on whether the plurality of reference signal blocks are received in a same time slot.

In some embodiments, determining whether the spatial resource is to be considered for spatial resource selection is further based on whether the quality criterion is met for at least one of a group of most recently received reference signal blocks of at least one spatial resource of the plurality of spatial resources.

In some embodiments, determining whether the spatial resource is to be considered for spatial resource selection comprises letting the quality criterion determination of a first received reference signal block have more impact than the quality criterion determination of a second received reference signal block when the first received reference signal block is more recently received than the second received reference signal block.

In some embodiments, the determination of whether the spatial resource is to be considered for spatial resource selection is applied to the different frequency intervals in which the plurality of reference signal blocks are received.

In some embodiments, the determination of whether the spatial resource is to be considered for spatial resource selection is applied to one or more frequency intervals in which none of the plurality of reference signal blocks are received.

In some embodiments, the spatial resources are beams of a beam-forming application, or antennas of a multi-antenna arrangement, or multiple-input multiple-output (MIMO) streams.

In some embodiments, the reference signal blocks comprises one or more of: uplink reference signals, sounding reference signals, demodulation reference signals, and phase tracking reference signals.

In some embodiments, the method further comprises selecting a spatial resource based on spatial resources which have been determined to be considered for spatial resource selection.

In some embodiments, selecting a spatial resource comprises selecting one of the spatial resources which have been determined to be considered for spatial resource selection, and/or selecting a spatial resource which is a combination of two or more of the spatial resources which have been determined to be considered for spatial resource selection.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for spatial resource selection from a plurality of spatial resources. The apparatus comprises controlling circuitry configured to cause—for each spatial resource of the plurality of spatial resources—reception of a plurality of reference signal blocks using the spatial resource (wherein reception of at least some of the reference signal blocks are in different frequency intervals and during different time intervals), determination (for each received reference signal block) of whether or not a signal quality metric of the received reference signal block meets a quality criterion, and determination of whether the spatial resource is to be considered for spatial resource selection based on the quality criterion determinations of the received reference signal blocks.

A fourth aspect is a network node comprising the apparatus of the third aspect.

In some embodiments, any of the above aspects may additionally have features identical with or corresponding to any of the various features as explained above for any of the other aspects.

An advantage of some embodiments is that approaches are provided to spatial resource selection in scenarios where reference signals are transmitted in different frequency intervals at different time intervals.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
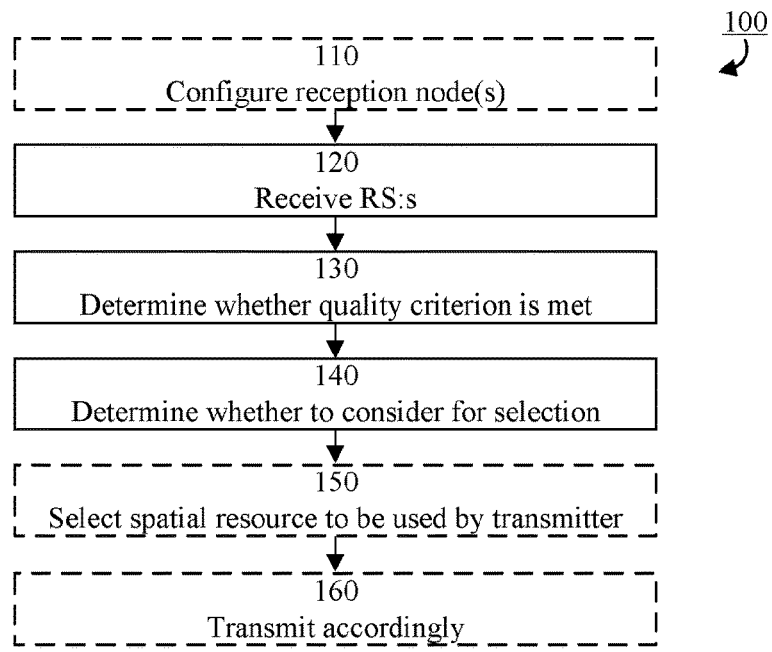
FIG. 1 is a flowchart illustrating example method steps according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, the terms signal-to-interference-and-noise ratio (SINR), signal-to-interference ratio (SIR), and signal-to-noise ratio (SNR) are used interchangeably herein, and any such reference is meant to be equally applicable for any of the terms, as well as for any other suitable signal quality metric.

In the following, embodiments will be described where approaches are provided for spatial resource selection in scenarios where a wireless communication system utilizes the same, or overlapping, frequency ranges for communication in a first link direction (e.g., uplink, UL) and for communication in a second link direction (e.g., downlink, DL) and where channel conditions estimated based on reference signals communicated in the first link direction are used to approximate channel conditions for communication in the second link direction, which are in turn used for spatial resource selection for transmission in the second link direction.

For example, in a time division duplex (TDD) network, the same frequency is typically used for uplink and downlink communication and the radio channel may be assumed to be reciprocal. Thus, knowledge obtained of the radio channel in the uplink (e.g., by estimating the radio channel based on uplink reference signals) can be used to determine spatial resources for downlink transmissions; and vice versa.

Particularly, some embodiments focus on spatial resource selection for scenarios where reference signals are transmitted in different frequency intervals at different time intervals (e.g., due to frequency hopping of the reference signals).

Some examples are presented herein for transmission beam selection based on channel estimation of reference signal reception using a corresponding reception beam. It should be noted, however, that embodiments may be equally applicable to other spatial resource selection scenarios.

An advanced antenna system (AAS) may significantly improve network performance (e.g., throughput, coverage, capacity, etc.) by utilizing beamforming and MIMO techniques.

Generally, the term spatial resource may refer to any spatial resource for such systems, e.g., one or more of: a transmission beam, a reception beam, an antenna or antenna element, a multiple-input multiple-output (MIMO) stream, or similar.

For example, channel estimation can be performed directly based on signals received on all antennas, or after a spatial beam transformation from antenna space to beam space (e.g., to transform signals received on all antennas to signals of beam directions), and procedures described herein for beam space may be equally applicable for antenna space, and vice versa.

To illustrate scenarios where some embodiments are applicable, a particular example scenario related to discontinuous transmission (DTX) state handling in relation to reciprocity-based beamforming for downlink transmissions based on uplink sounding reference signal (SRS) reception in a TDD system will now be described.

When the radio channel is poor (e.g., has relatively low signal-to-interference-and-noise ratio, SINR; for example SINR below a threshold value), the noise and interference factors may dominate the channel estimation achieved based on SRS reception. Downlink transmission beamforming based on such channel estimation will typically not be adequate (e.g., may not direct transmission beams in a suitable way to convey transmitted information to the users) and may negatively impact performance.

Therefore, a DTX detection technique may be used to determine usefulness (e.g., reliability) of SRS channel estimates. When a SRS channel estimate is determined to be useful, it may be labeled as non-DTX, and when a SRS channel estimate is determined to be not useful, it may be labeled as DTX. For example, a SRS channel estimate may be determined to be useful when a SINR value of the corresponding SRS reception falls above a threshold value, and a SRS channel estimate may be determined to be not useful otherwise.

In relation to beam selection, a DTX state may be determined per beam for each SRS reception, and a beam may be set to invalid (i.e., not to be considered for beam selection) when DTX is detected, and to valid when non-DTX is detected. In some embodiments, a beam may be set to invalid by setting channel estimates (e.g., for all subcarriers) of the beam to zero. Thereby, there will be no energy on the invalid beam when beamforming weights are calculated.

However, when SRS frequency hopping is enabled, there may typically be multiple DTX state determinations for each beam; each of which associates with a corresponding SRS hop reception. Thereby, the determination of a beam as invalid or valid may be ambiguous. One way to handle this ambiguity is to use each SRS hop to determine beam validity only for frequencies (e.g., defined by resource blocks, RB:s) covered by SRS hop. However, such an approach may lead to that outdated channel estimates are used for downlink beam selection (e.g., if inter-slot frequency hopping is configured for SRS), and/or that beams with good enough quality are unnecessarily set to invalid.

Some embodiments address the ambiguity by determining beam validity not only based on the DTX state of current SRS hop in a symbol, but also based on the DTX state of SRS hops from other symbols. In various embodiments, determining beam validity is—alternatively or additionally—based on one or more of: hopping type (inter-slot or intra-slot), age of DTX states, and DTX states of other beams. Data transmission scheduling may also take the per-hop beam validity into account.

FIG. 1 illustrates an example method 100 according to some embodiments. The example method 100 may be for a transmitter node and/or a network node. The example method 100 may, in some embodiments, be performed, or performable, by a radio access node, a base station, or a control node of a communication network.

The method 100 is for spatial resource selection from a plurality of spatial resources. The method 100 is particularly applicable in reciprocity scenarios.

The spatial resources may, for example, be beams of a beam-forming application, or antennas of a multi-antenna arrangement, or multiple-input multiple-output (MIMO) streams.

In optional step 110, one or more reception nodes (e.g., user equipments, UE:s) may be configured to transmit reference signals for use in the spatial resource selection. The configuration may be in accordance with any suitable approach. For example, the configuration may involve transmission of a configuration signal to the reception node(s). The configuration may, for example, specify one or more of: whether or not to apply frequency hopping, a frequency hopping pattern (in time and/or frequency domain), whether to apply inter-slot or intra-slot hopping, etc.

Steps 120, 130 and 140 are performed for each spatial resource of the plurality of spatial resources.

In step 120, a plurality of reference signal blocks (RS:s) are received using the spatial resource. For example, when the spatial resource selection concerns transmission beam selection, the reference signal blocks may be received using a corresponding reception beam. The plurality of reference signal blocks may comprise two, three, four, or more reference signal blocks.

Generally, the reference signal blocks may be any suitable reference signaling. For example, the reference signal blocks may comprise one or more of: uplink reference signals, sounding reference signals (SRS:s), demodulation reference signals (DMRS:s), and phase tracking reference signals.

Also generally, at least some of the reference signal blocks are received in different frequency intervals and during different time intervals (e.g., due to frequency hopping). The reference signal blocks may further be received in a same slot (intra-slot hopping) or in two or more different slots (inter-slot hopping), according to some embodiments.

In step 130, it is determined—for each received reference signal block—whether or not a signal quality metric (e.g., SINR) of the received reference signal block meets a quality criterion (e.g., falls above a threshold value). As described above, the received reference signal block may be labeled as non-DTX when the quality criterion is met and as DTX otherwise, according to some embodiments.

In step 140, it is determined whether the spatial resource is to be considered for spatial resource selection based on the quality criterion determinations of the received reference signal blocks.

As described above, step 140 may involve marking the spatial resource as valid or invalid, according to some embodiments. Valid spatial resources may then be used for spatial resource selection according to any suitable approach, while invalid spatial resources may be excluded from spatial resource selection (e.g., by setting corresponding channel estimates to zero).

Considering a spatial resource for selection may generally comprise one or more of: actually selecting that spatial resource, having that spatial resource as a candidate for selection, and selecting a spatial resource which is a combination of that spatial resource and other spatial resources, any of which may be embodied in a selection step as illustrated by optional step 150.

In optional step 150, a spatial resource is selected based on the spatial resources determined as valid (i.e., to be considered) in step 140. The selected spatial resource may be for use by the transmitter for transmission to the reception node(s).

In optional step 160, the selected spatial resource is used for transmission.

In some typical applications, the beams (spatial resources) processed in steps 120-140 are not used directly as transmission beams. Instead, the selection of step 150 comprises calculation of a precoder for transmission (selected spatial resource) based on the channel estimates of the valid/considerable beams.

It should be noted that selection of a spatial resource (whether it is a spatial resource processed in steps 120-140, or a combination of such spatial resources) may be used for other purposes than transmission. Other examples include using the selected spatial resource(s) for reception equalization and/or scheduling of transmissions for outgoing or incoming traffic.

The determination in step 140 of whether the spatial resource is to be considered for spatial resource selection may be implemented in various ways.

For example, step 140 may comprise determining whether the spatial resource is to be considered for spatial resource selection based on more than one of the quality criterion determinations of the received reference signal blocks.

Alternatively or additionally, step 140 may comprise determining whether the spatial resource is to be considered for spatial resource selection based on one or more quality criterion determinations associated with received reference signal blocks other than the most recently received reference signal block and/or associated with received reference signal blocks other than a group of most recently received reference signal blocks (e.g., reference signal blocks received in a current slot).

Yet alternatively or additionally, step 140 may comprise determining whether the spatial resource is to be considered for spatial resource selection in one frequency interval based on one or more quality criterion determinations associated with received reference signal blocks received in other frequency intervals.

In some embodiments, step 140 may comprise determining that the spatial resource is to be considered for spatial resource selection when the quality criterion is met for the most recently received reference signal block.

In some embodiments, step 140 may comprise determining that the spatial resource is not to be considered for spatial resource selection when the quality criterion is not met for the most recently received reference signal block.

In some embodiments, step 140 may comprise determining that the spatial resource is to be considered for spatial resource selection when the quality criterion is met for at least one of a group of most recently received reference signal blocks (e.g., reference signal blocks received in a current slot).

In some embodiments, step 140 may comprise determining that the spatial resource is not to be considered for spatial resource selection when the quality criterion is not met for at least one of a group of most recently received reference signal blocks (e.g., reference signal blocks received in a current slot).

In some embodiments, step 140 may comprise determining that the spatial resource is to be considered for spatial resource selection when the quality criterion is met for at least a first number (e.g., one, two, half, all, or any other suitable threshold value) of the plurality of received reference signal blocks, or of a group of most recently received reference signal blocks (e.g., reference signal blocks received in a current slot).

In some embodiments, step 140 may comprise determining that the spatial resource is not to be considered for spatial resource selection when the quality criterion is not met for at least a second number (e.g., one, two, half, all, or any other suitable threshold value; which may be the same as—or differ from—the first number) of the plurality of received reference signal blocks, or of a group of most recently received reference signal blocks (e.g., reference signal blocks received in a current slot).

In some embodiments, the determination of step 140 may be further based on whether the quality criterion is met for at least one of a group of most recently received reference signal blocks (e.g., reference signal blocks received in a current slot) of at least one spatial resource of the plurality of spatial resources.

For example, when the quality criterion is met for at least one of a group of most recently received reference signal blocks (e.g., to an extent that the corresponding spatial resource will be considered for selection), a first (default) approach may be used for determining whether the spatial resource under consideration is (also) to be considered for selection, while when the quality criterion is not met for at least one of a group of most recently received reference signal blocks (e.g., such that no spatial resource will be considered for selection if the first approach was used), a second approach may be used for determining whether the spatial resource under consideration is to be considered for selection. The second approach is typically more relaxed than the first approach; allowing spatial resources to be considered more easily. The second approach may be seen as a worst case scenario approach.

Generally, determining whether the spatial resource is to be considered for spatial resource selection may be further based on whether or not the plurality of reference signal blocks are received in a same time slot (intra-slot frequency hopping or inter-slot frequency hopping).

Also generally, determining whether the spatial resource is to be considered for spatial resource selection may comprise letting the quality criterion determination of a first received reference signal block have more impact than the quality criterion determination of a second received reference signal block when the first received reference signal block is more recently received than the second received reference signal block. In such approaches, relatively old reference signal blocks may be seen as less trusted than relatively new reference signal blocks. Implementation may be achieved by applying weights in the form of scaling values during the determination of step 140.

For example, if DTX is represented by a negative value (e.g., −1) and non-DTX is represented by a positive value (e.g., 1), all values of the previous slot may be weighted by 0.5, all values of the slot before that may be weighted by 0.25, and all values of earlier slots may be weighted by 0 (i.e., discarded). Then, the weighted values may be summed and the result compared to a threshold (e.g., 0) to determine whether the spatial resource is to be considered for spatial resource selection.

In some embodiments, the determination of step 140 may further comprise applying a determination regarding consideration of a spatial resource for one frequency interval also to other frequency intervals than those in which the plurality of reference signal blocks are received. For example, such application may be to one or more frequency intervals in which none of the plurality of reference signal blocks are received. This may be particularly useful, for example, when a reception frequency range does not cover the entire transmission frequency range, and/or for inter-slot hopping.

It should be noted that any suitable combination of the above approaches relating to step 140 may also be applicable according to some embodiments.

Figure 2:
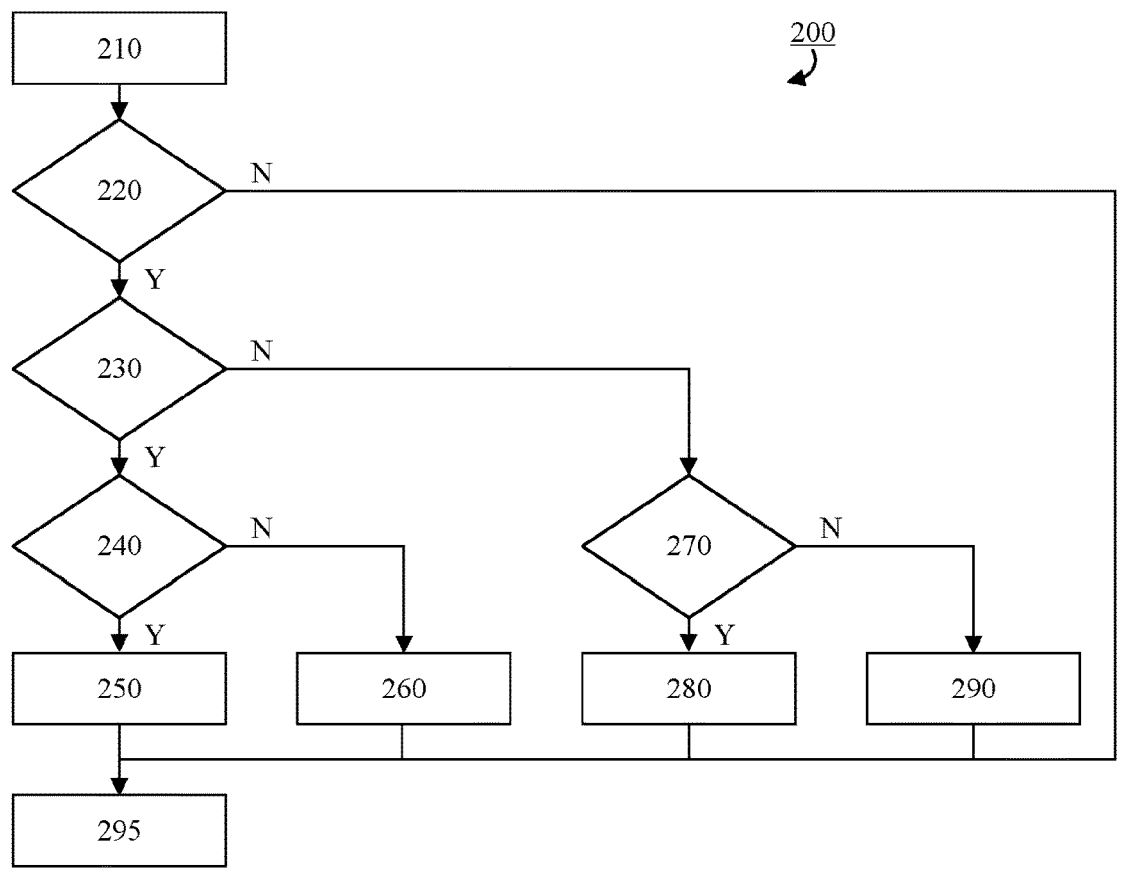
FIG. 2 is a flowchart illustrating example method steps according to some embodiments.

FIG. 2 illustrates an example method 200 according to some embodiments. The method may be used as an implementation of step 140 of FIG. 1 in some embodiments.

In step 210, indications are acquired—for each received reference signal block—regarding whether or not a signal quality metric of the received reference signal block meets a quality criterion (compare with the determination of step 130 of FIG. 1). For example, the indications may relate to DTX/non-DTX labels (or DTX/non-DTX states).

In step 220, it is determined whether frequency hopping is enabled for reference signal transmissions. When frequency hopping is not enabled (N-path out of step 220), it is determined whether or not the spatial resource is to be considered for spatial resource selection (e.g., the beam is considered valid or invalid) based on received reference signal blocks according to any suitable approach, and the method proceeds directly to step 295, which is described later herein. When frequency hopping is enabled (Y-path out of step 220), the method proceeds to step 230.

In step 230, it is determined whether the frequency hopping is inter-slot (i.e., whether the plurality of reference signal blocks are not received in a same time slot). When the frequency hopping is inter-slot (Y-path out of step 230), the method proceeds to step 240. When the frequency hopping is not inter-slot (N-path out of step 230), i.e., when the frequency hopping is intra-slot and the plurality of reference signal blocks are received in a same time slot, the method proceeds to step 270.

In step 240 (inter-slot frequency hopping; the plurality of reference signal blocks are not received in a same time slot), it is determined whether or not the quality criterion is met for at least one of a group of most recently received reference signal blocks (e.g., reference signal blocks received in a current slot) of at least one spatial resource of the plurality of spatial resources.

For example, step 240 may comprise determining whether all received reference signal blocks in a current slot are labeled DTX for all of a plurality of beams under consideration. When all received reference signal blocks in a current slot are labeled DTX for all of beams (Y-path out of step 240), the method proceeds to step 250. When all received reference signal blocks in a current slot are not labeled DTX for all of beams (N-path out of step 240), the method proceeds to step 260.

In step 260, it may be determined that the spatial resource is to be considered for spatial resource selection when the quality criterion is met for the most recently received reference signal block (e.g., the beam may be considered valid when the latest received reference signal block is labeled non-DTX), and that the spatial resource is not to be considered for spatial resource selection otherwise.

Alternatively, it may be determined in step 260 that the spatial resource is to be considered for spatial resource selection when the quality criterion is met for at least one of a group of most recently received reference signal blocks (e.g., the beam may be considered valid when one or more of the reference signal blocks received in a current slot are labeled non-DTX), and that the spatial resource is not to be considered for spatial resource selection otherwise.

Alternatively, it may be determined in step 260 that the spatial resource is to be considered for spatial resource selection when the quality criterion is met for at least a first number of a group of most recently received reference signal blocks (e.g., the beam may be considered valid when the first number or more of the reference signal blocks received in a current slot are labeled non-DTX), and that the spatial resource is not to be considered for spatial resource selection otherwise.

In any case, the approach of step 260 may be considered as a first (default) approach for inter-slot hopping, wherein beam validity is determined based on DTX states of the current slot.

In step 250, it may be determined that the spatial resource is to be considered for spatial resource selection when the quality criterion is met for at least one of the received plurality of reference signal blocks (e.g., the beam may be considered valid when one or more of the reference signal blocks received in the current slot and in one or more previous slots are labeled non-DTX), and that the spatial resource is not to be considered for spatial resource selection otherwise.

The approach of step 250 may be considered as a second approach for inter-slot hopping, wherein beam validity is determined based on DTX states of more than the current slot.

In step 270 (intra-slot frequency hopping; the plurality of reference signal blocks are received in the same time slot), it is determined whether or not the quality criterion is met for at least one of the plurality of received reference signal blocks of at least one spatial resource of the plurality of spatial resources.

For example, step 270 may comprise determining whether at least one received reference signal block in a current slot is labeled non-DTX.

When at least one received reference signal block in a current slot is labeled non-DTX (Y-path out of step 270), the method proceeds to step 280, where it is determined that the spatial resource is to be considered for spatial resource selection (e.g., the beam is considered valid).

When all received reference signal blocks in a current slot are labeled DTX (N-path out of step 270), the method proceeds to step 290, where it is determined that the spatial resource is not to be considered for spatial resource selection (e.g., the beam is considered invalid).

After any of steps 250, 260, 280, and 290, as well as after taking the N-path out of step 220, the method proceeds to step 295.

In step 295, inputs to spatial resource selection (compare with step 150 of FIG. 1) are prepared based on the determinations of whether or not the respective spatial resources are to be considered (e.g., validity of beams). For example, channel estimates of valid spatial resources may be used directly as inputs to spatial resource selection, while invalid spatial resources may be excluded from spatial resource selection (e.g., by setting corresponding channel estimates to zero).

In some embodiments, the determination of whether or not a spatial resource is to be considered for spatial resource selection (e.g., whether a beam is valid or invalid) may apply to (only) frequency intervals where the reference signal block was received which has a signal quality metric corresponding to the spatial resource determination (e.g., meeting the quality criterion in the case of valid beams and not meeting the quality criterion in the case of invalid beams).

Alternatively, the determination of whether or not a spatial resource is to be considered for spatial resource selection may apply to (only) frequency intervals where the reference signal blocks of a group of most recently received reference signal blocks was received (e.g., frequency intervals covered by reference signal blocks received in the current slot).

Alternatively, the determination of whether or not a spatial resource is to be considered for spatial resource selection may apply to (only) all frequency intervals where the reference signal blocks of the plurality of reference signal blocks was received.

Alternatively, the determination of whether or not a spatial resource is to be considered for spatial resource selection may apply to all frequency intervals where the spatial resource may be relevant.

Figure 3:
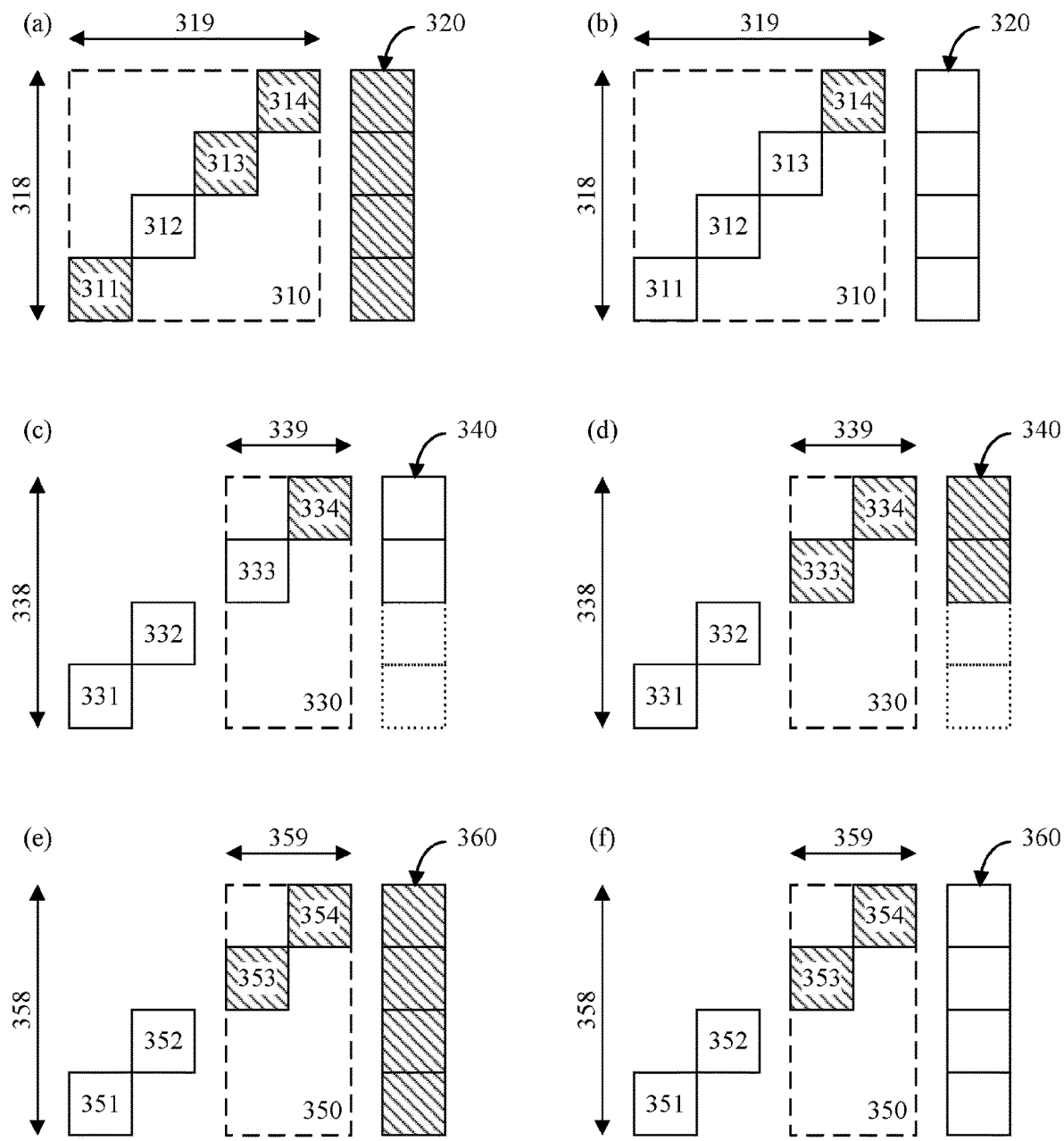
FIG. 3 is a schematic drawing illustrating various spatial resource categorizations according to some embodiments.

FIG. 3 schematically illustrates some various spatial resource categorizations according to some embodiments, in a context of a reference signal frequency range 318; 338; 358 and a time duration 319; 339; 359 (e.g., defined through a number of orthogonal frequency division multiplexing—OFDM—symbols).

Parts (a) and (b) show intra-slot frequency hopping scenarios. Thus, the plurality of reference signal blocks 311, 312, 313, 314 are received in a same time slot 310. A corresponding beam validity is schematically illustrated by 320.

In the example of part (a), reference signal blocks 311, 313, and 314 have signal quality metrics that do not meet the quality criterion (illustrated by striping), while reference signal block 312 has a signal quality metric that meets the quality criterion, and the beam 320 is considered invalid (also illustrated by striping) for the entire frequency range 318.

Determining that the spatial resource 320 is not to be considered for spatial resource selection when the quality criterion is not met for the most recently received reference signal block 314 may yield the result illustrated in part (a).

Determining that the spatial resource 320 is not to be considered for spatial resource selection when the quality criterion is not met for at least one 311, 313, 314 of a group of most recently received reference signal blocks 311, 312, 313, 314 may yield the result illustrated in part (a).

Determining that the spatial resource 320 is not to be considered for spatial resource selection when the quality criterion is not met for at least a number (e.g., one, two/half, or three) of the plurality of received reference signal blocks, or of a group of most recently received reference signal blocks 311, 312, 313, 314 may yield the result illustrated in part (a).

In the example of part (b), reference signal block 314 has a signal quality metric that do not meet the quality criterion (illustrated by striping), while reference signal blocks 311, 312, 313 have signal quality metrics that meet the quality criterion, and the beam 320 is considered valid for the entire frequency range 318.

Determining that the spatial resource 320 is to be considered for spatial resource selection when the quality criterion is met for at least one 311, 312, 313 of a group of most recently received reference signal blocks 311, 312, 313, 314 (compare with step 280 of FIG. 2) may yield the result illustrated in part (b).

Determining that the spatial resource 320 is to be considered for spatial resource selection when the quality criterion is met for at least a number (e.g., one, two/half, or three) of the plurality of received reference signal blocks, or of a group of most recently received reference signal blocks 311, 312, 313, 314 may yield the result illustrated in part (b).

Parts (c), (d), (e) and (f) show inter-slot frequency hopping scenarios. Thus, the plurality of reference signal blocks 331, 332, 333, 334; 351, 352, 353, 354 are not received in a same time slot 330; 350. Corresponding beam validity is schematically illustrated by 340; 360.

In the example of part (c), reference signal block 334 has a signal quality metric that do not meet the quality criterion (illustrated by striping), while reference signal blocks 331, 332, 333 have signal quality metrics that meet the quality criterion, and the beam 340 is considered valid for the frequency intervals covered by reference signals blocks received in the slot 330.

Determining that the spatial resource 340 is to be considered for spatial resource selection when the quality criterion is met for at least one 333 of a group of most recently received reference signal blocks 333, 334 (compare with step 260 of FIG. 2) may yield the result illustrated in part (c).

In the example of part (d), reference signal blocks 333, 334 have signal quality metrics that do not meet the quality criterion (illustrated by striping), while reference signal blocks 331, 332 have signal quality metrics that meet the quality criterion, and the beam 340 is considered invalid (also illustrated by striping) for the frequency intervals covered by reference signals blocks received in the slot 330.

Determining that the spatial resource 340 is not to be considered for spatial resource selection when the quality criterion is not met for the most recently received reference signal block 334 may yield the result illustrated in part (d).

Determining that the spatial resource 340 is not to be considered for spatial resource selection when the quality criterion is not met for at least one 333, 334 of a group of most recently received reference signal blocks 333, 334 may yield the result illustrated in part (d).

Determining that the spatial resource 340 is not to be considered for spatial resource selection when the quality criterion is not met for at least a number (e.g., one/half, or two) of a group of most recently received reference signal blocks 333, 334 may yield the result illustrated in part (d).

In the example of part (e), reference signal blocks 353, 354 have signal quality metrics that do not meet the quality criterion (illustrated by striping), while reference signal blocks 351, 352 have signal quality metrics that meet the quality criterion, and the beam 360 is considered invalid (also illustrated by striping) for the entire frequency range 358.

Determining that the spatial resource 360 is not to be considered for spatial resource selection when the quality criterion is not met for the most recently received reference signal block 354 may yield the result illustrated in part (e).

Determining that the spatial resource 360 is not to be considered for spatial resource selection when the quality criterion is not met for at least one 353, 354 of a group of most recently received reference signal blocks 353, 354 may yield the result illustrated in part (e).

Determining that the spatial resource 360 is not to be considered for spatial resource selection when the quality criterion is not met for at least a number (e.g., one/half, or two) of a group of most recently received reference signal blocks 353, 354 may yield the result illustrated in part (e).

In the example of part (f), reference signal blocks 353, 354 have signal quality metrics that do not meet the quality criterion (illustrated by striping), while reference signal blocks 351, 352 have signal quality metrics that meet the quality criterion, and the beam 360 is considered valid for the entire frequency range 358.

Determining that the spatial resource 360 is to be considered for spatial resource selection when the quality criterion is met for at least one 351, 352 of the plurality of received reference signal blocks 351, 352, 353, 354 (compare with step 250 of FIG. 2) may yield the result illustrated in part (f).

With reference to the example of determining beam validity for a certain resource block (RB) in a scenario with SRS frequency hopping based on a determination of whether an SRS is labeled non-DTX or DTX, it may generally be beneficial to take the labels from different SRS hops into account, even when the hops are transmitted in different resource blocks. One motivation is that the SRS labels are based on time domain characteristics.

As indicated above, the determination of whether a beam is valid may apply one or more of a large variety of approaches. For example, the determination of whether a beam is valid may comprise determining that the beam is invalid if there is a DTX label for the current hop (compare, e.g., with parts (a), (d) and (e) of FIG. 3), determining that the beam is valid if there is a non-DTX label for at least one hop (compare, e.g., with parts (b), (c) and (f) of FIG. 3), determining that the beam is invalid if there is a DTX label for at least one hop (compare, e.g., with parts (a), (d) and (e) of FIG. 3), determining that the beam is invalid if there are more hops with DTX labels than with non-DTX labels (compare, e.g., with part (a) of FIG. 3), determining beam validity based on the aging of labels (implemented by, e.g., weighting, filtering, discarding, etc.), determining that the beam is valid if all other beams are invalid and at least one hop has a non-DTX label for the current beam (compare, e.g., with part (f) of FIG. 3), determining beam validity based on the state of frequency adjacent hops (beneficial, e.g., when the frequency ranges for transmission and reception do not completely overlap), and any combinations thereof.

Some further examples are illustrated in the following list (corresponding apparatus, network node and computer program product are also envisioned):

1. A method (e.g., for a network node) comprising: possibly configuring one or more other devices (e.g., UE:s) for transmission of sounding reference signals (SRS:s), deriving the DTX states of received reference signals, and determining beam or antenna validity from the DTX states.
2. A method as in 1, wherein determining beam or antenna validity is based on whether or not frequency hopping is used for SRS transmission.
3. A method as in 2, wherein determining beam or antenna validity is based on whether SRS frequency hopping is inter-slot or intra-slot.
4. A method as in 2 or 3, wherein beam or antenna validity for RB:s covered by a certain SRS hop is determined from the (one) DTX state of this SRS hop.
5. A method as in 2 or 3, wherein beam or antenna validity for RB:s covered by a certain SRS hop is determined from DTX states of this and/or one or more other SRS hops.
6. A method as in 5, wherein a beam or antenna is determined invalid for all RB:s in all hops if DTX is detected for at least one SRS hop.
7. A method as in 5, wherein a beam or antenna is determined valid for all RB:s in all hops if non-DTX is detected for at least one SRS hop.
8. A method as in 5, wherein a beam or antenna is determined invalid for all RB:s in all hops if the number of detected DTX:s is greater than the number of detected non-DTX:s, and vice versa.
9. A method as in 5, wherein SRS frequency hopping is performed in an intra-slot manner, and beam or antenna validity of RB:s associated with SRS hops received in previous slot(s) is determined based on SRS hops received in the current slot.
10. A method as in 3 to 9, wherein beam or antenna validity is determined by considering whether all other beams or antenna are invalid.
11. A method as in 3 to 10, wherein scheduling of data transmission for a RB is performed by considering whether beam or antenna validity for the RB is determined based on DTX states of SRS hops that do not cover this RB.
12. A method as in 1 to 11, wherein DTX states are derived from received demodulation reference signals of physical channel for user data transmission.

Figure 4:
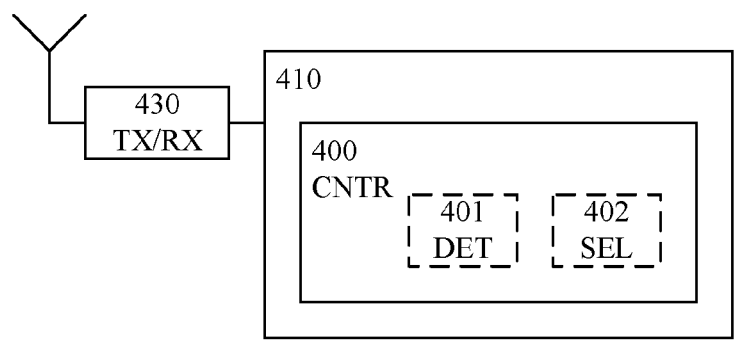
FIG. 4 is a schematic block diagram illustrating an example apparatus according to some embodiments.

FIG. 4 schematically illustrates an example apparatus 410 for spatial resource selection from a plurality of spatial resources according to some embodiments. The apparatus 410 may be comprisable, or comprised, in a network node (e.g., a radio access node such as a base station, or a network control node such as a centralized server node) according to some embodiments. Alternatively or additionally, the apparatus 410 may be configured to cause execution of (e.g., execute) one or more of the method steps of any of FIGS. 1 and 2, or otherwise described herein.

The apparatus comprises a controller (CNTR; e.g., controlling circuitry or a control module) 400.

The controller is configured to cause—for each spatial resource of the plurality of spatial resources—reception of a plurality of reference signal blocks using the spatial resource, wherein reception of at least some of the reference signal blocks are in different frequency intervals and during different time intervals (compare with step 120 of FIG. 1).

To this end, the controller may comprise, or be otherwise associated with (e.g., connectable, or connected, to) a receiver (e.g., receiving circuitry or a reception module). In the example of FIG. 4, the receiver is illustrated as part of a transceiver (TX/RX) 430. The receiver may be configured to receive the plurality of reference signal blocks as described above.

The controller is configured to cause—for each spatial resource of the plurality of spatial resources—determination, for each received reference signal block, of whether or not a signal quality metric of the received reference signal block meets a quality criterion (compare with step 130 of FIG. 1) and determination of whether the spatial resource is to be considered for spatial resource selection based on the quality criterion determinations of the received reference signal blocks (compare with step 140 of FIG. 1).

To this end, the controller may comprise, or be otherwise associated with (e.g., connectable, or connected, to) a determiner (DET; e.g., determining circuitry or a determination module) 401. The determiner may be configured to determine whether signal quality metrics of the received reference signal blocks meet the quality criterion, and—based thereon—whether the spatial resources are to be considered for spatial resource selection.

The controller may also be configured to cause selection of a spatial resource based on spatial resources which have been determined to be considered for spatial resource selection (compare with step 150 of FIG. 1).

To this end, the controller may comprise, or be otherwise associated with (e.g., connectable, or connected, to) a selector (SEL; e.g., selecting circuitry or a selection module) 402. The selector may be configured to select a spatial resource based on spatial resources which have been determined to be considered for spatial resource selection.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 5:
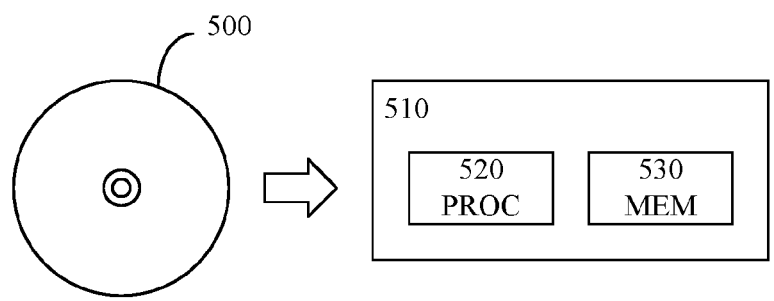
FIG. 5 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC; e.g., data processing circuitry or a data processing unit) 520, which may, for example, be comprised in a network node 510. When loaded into the data processor, the computer program may be stored in a memory (MEM) 530 associated with or comprised in the data-processing unit. According to some embodiments, the computer program may, when loaded into and run by the data processing unit, cause execution of method steps according to, for example, any of the methods illustrated in FIG. 1 or 2, or otherwise described herein.

Figure 6:
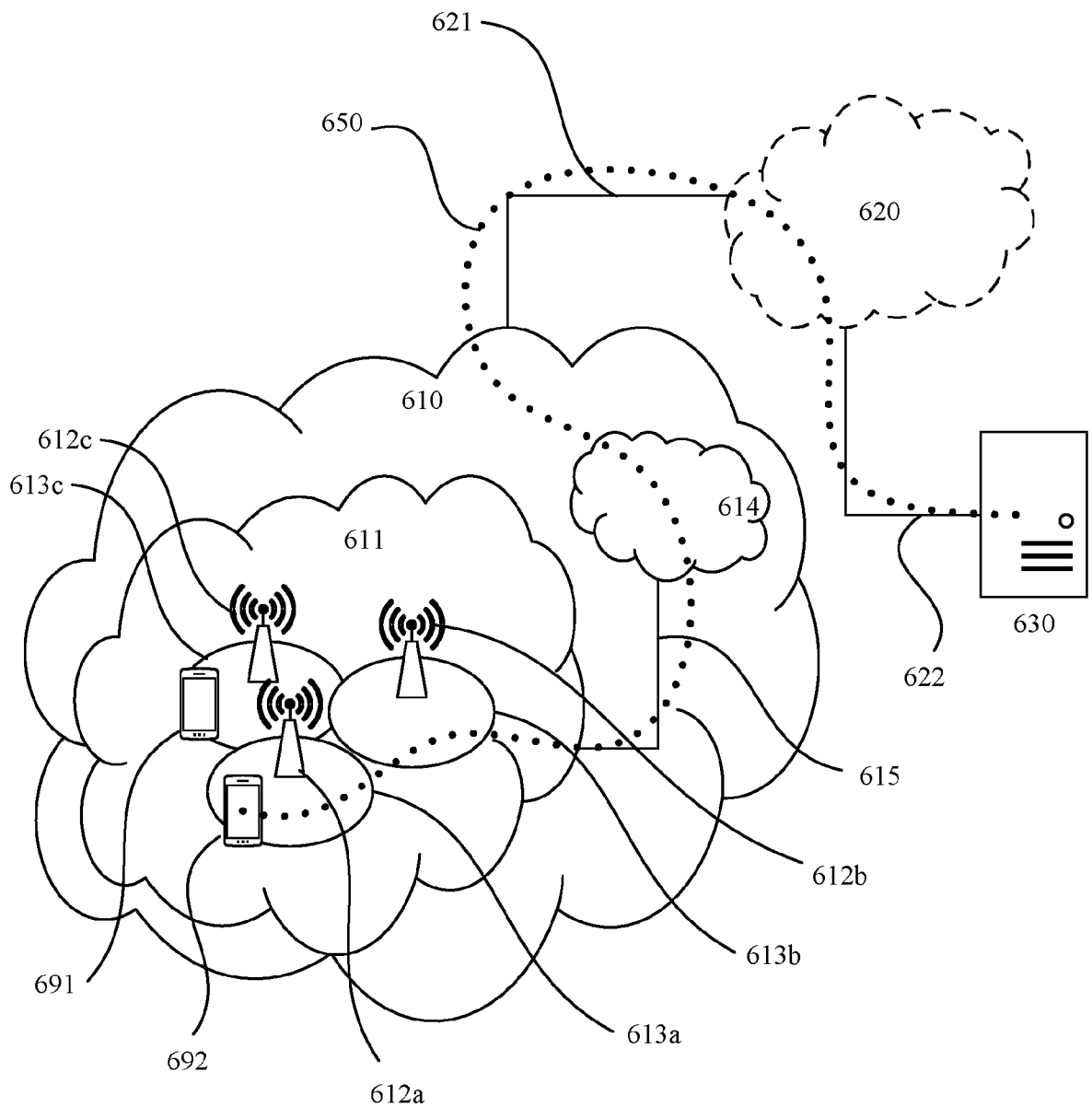
FIG. 6 illustrates a telecommunication network connected via an intermediate network to a host computer in accordance with some embodiments.

With reference to FIG. 6, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more sub-networks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Example implementations, in accordance with an embodiment, of the UE, base station and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

Figure 7:
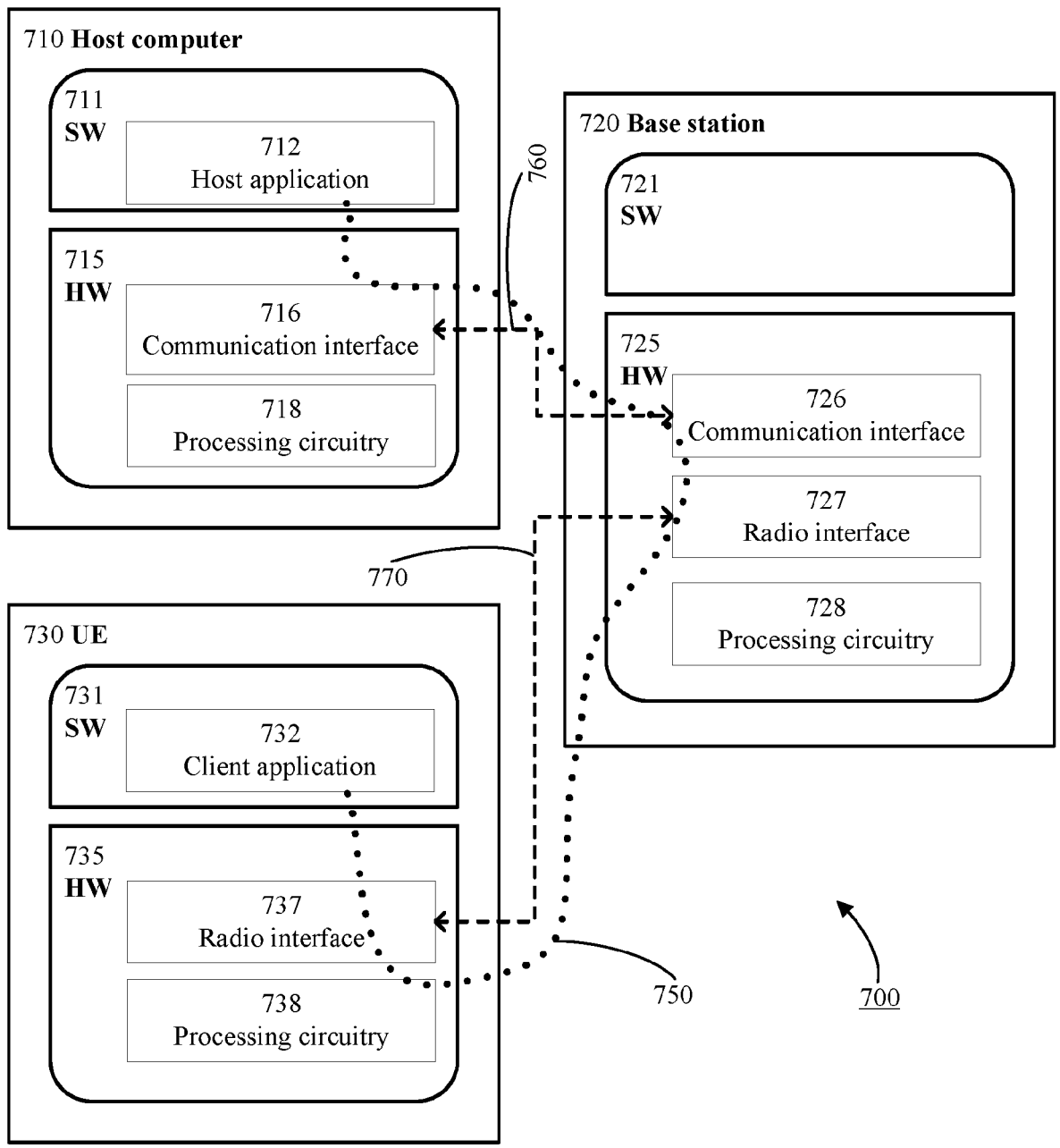
FIG. 7 illustrates a host computer communicating via a base station with a user equipment over a partially wireless connection in accordance with some embodiments.

It is noted that host computer 710, base station 720 and UE 730 illustrated in FIG. 7 may be similar or identical to host computer 630, one of base stations 612*a*, 612*b*, 612*c* and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the spatial resource selection to be used by a transmitter, and thereby provide benefits such as increased throughput.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figure 8:
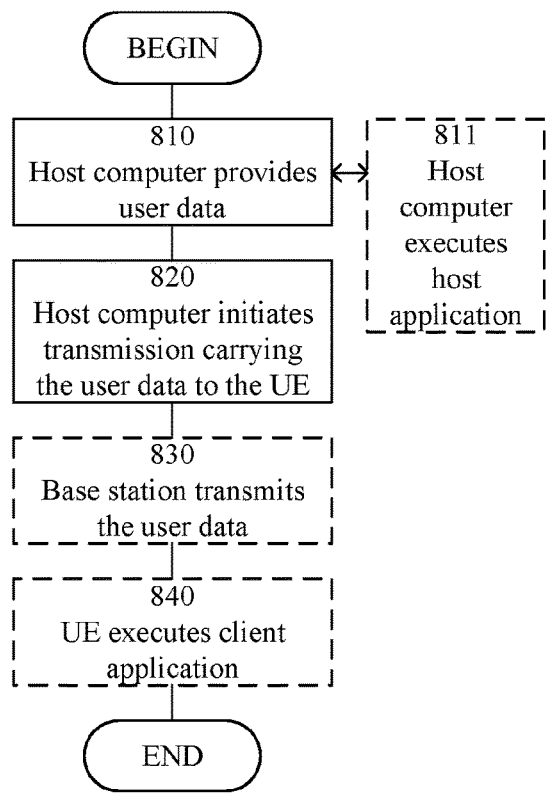
FIG. 8 is a flowchart illustrating example method steps implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

Figure 9:
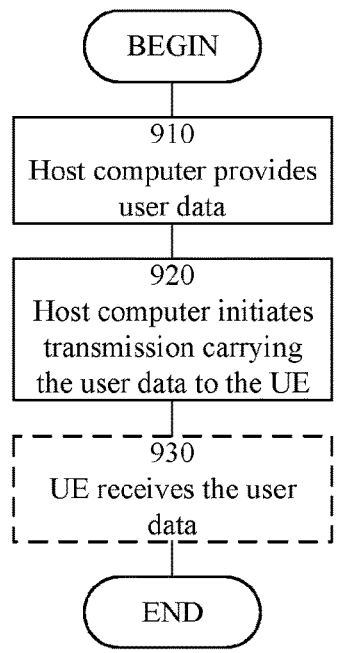
FIG. 9 is a flowchart illustrating example method steps implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figure 10:
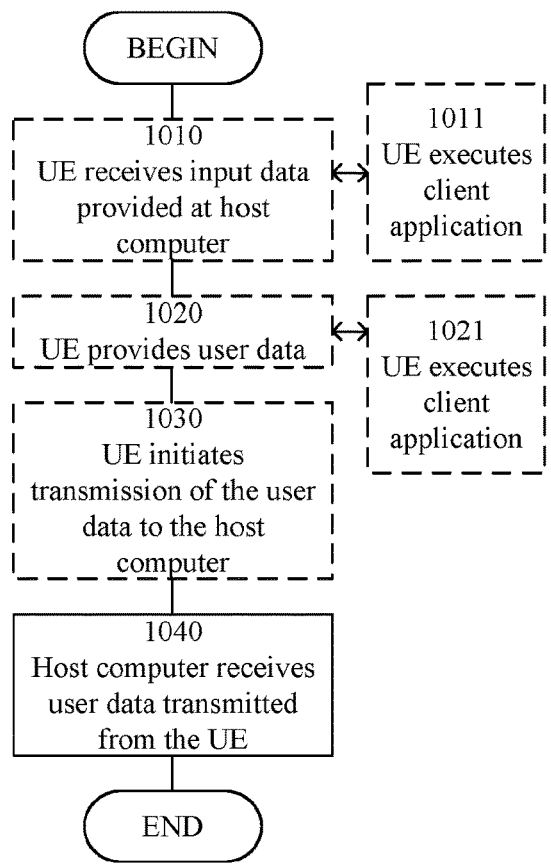
FIG. 10 is a flowchart illustrating example method steps implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

Figure 11:
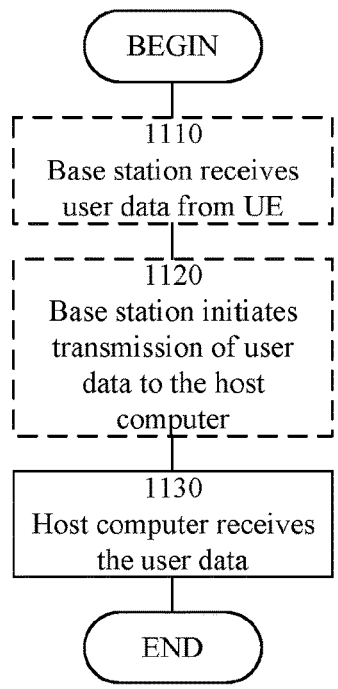
FIG. 11 is a flowchart illustrating example method steps implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group B Embodiments

B1. A method performed by a base station for spatial resource selection from a plurality of spatial resources, the method comprising—for each spatial resource of the plurality of spatial resources:
receiving a plurality of reference signal blocks using the spatial resource, wherein at least some of the reference signal blocks are received in different frequency intervals and during different time intervals;
determining, for each received reference signal block, whether or not a signal quality metric of the received reference signal block meets a quality criterion; and
determining whether the spatial resource is to be considered for spatial resource selection based on the quality criterion determinations of the received reference signal blocks.

B2. The method of any of the previous embodiments in Group B, further comprising:
obtaining user data; and
forwarding the user data to a host computer or a wireless device.

Group C Embodiments

C1. A base station for spatial resource selection, the base station comprising:
processing circuitry configured to perform any of the steps of any of the Group B embodiments;
power supply circuitry configured to supply power to the base station.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A base station configured to communicate with a user equipment (UE), the base station comprising a radio interface and processing circuitry configured to perform the method of any of embodiments D5 through D7.

D9. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D10. The communication system of embodiment D9 further including the base station.

D11. The communication system of any of embodiments D9 through D10, further including the UE, wherein the UE is configured to communicate with the base station.

D12. The communication system of any of embodiments D9 through D10, wherein:
the processing circuitry of the host computer is configured to execute a host application;
the UE is configured to execute a client application associated with the host application, thereby providing the user data to be received by the host computer.

D13. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group B embodiments.

D14. The method of embodiment D13, further comprising at the base station, receiving the user data from the UE.

D15. The method of any of embodiments D13 through D14, further comprising at the base station, initiating a transmission of the received user data to the host computer.

The invention claimed is:

1. A method for spatial resource selection from a plurality of spatial resources, the method comprising, for each spatial resource of the plurality of spatial resources:
receiving a plurality of reference signal blocks using the spatial resource, wherein at least some of the reference signal blocks are received in different frequency intervals and during different time intervals;
determining, for each received reference signal block, whether or not a signal quality metric of the received reference signal block meets a quality criterion; and
determining whether the spatial resource is to be considered for spatial resource selection based on the quality criterion determinations of the received reference signal blocks, wherein determining whether the spatial resource is to be considered for spatial resource selection comprises determining that the spatial resource is to be considered for spatial resource selection when the quality criterion is met for at least a first number of the plurality of received reference signal blocks.

2. The method of claim 1, wherein determining whether the spatial resource is to be considered for spatial resource selection comprises determining that the spatial resource is to be considered for spatial resource selection when the quality criterion is met for the most recently received reference signal block.

3. The method of claim 1, wherein determining whether the spatial resource is to be considered for spatial resource selection comprises determining that the spatial resource is not to be considered for spatial resource selection when the quality criterion is not met for the most recently received reference signal block.

4. The method of claim 1, wherein determining whether the spatial resource is to be considered for spatial resource selection comprises determining that the spatial resource is not to be considered for spatial resource selection when the quality criterion is not met for at least a second number of the plurality of received reference signal blocks.

5. The method of claim 1, wherein determining whether the spatial resource is to be considered for spatial resource selection is further based on whether the plurality of reference signal blocks are received in a same time slot.

6. The method of claim 1, wherein determining whether the spatial resource is to be considered for spatial resource selection is further based on whether the quality criterion is met for at least one of a group of most recently received reference signal blocks of at least one spatial resource of the plurality of spatial resources.

7. The method of claim 1, wherein determining whether the spatial resource is to be considered for spatial resource selection comprises letting the quality criterion determination of a first received reference signal block have more impact than the quality criterion determination of a second received reference signal block when the first received reference signal block is more recently received than the second received reference signal block.

8. The method of claim 1, wherein the determination of whether the spatial resource is to be considered for spatial resource selection is applied to the different frequency intervals in which the plurality of reference signal blocks are received.

9. The method of claim 8, wherein the determination of whether the spatial resource is to be considered for spatial resource selection is applied to one or more frequency intervals in which none of the plurality of reference signal blocks are received.

10. The method of claim 1, wherein the spatial resources are beams of a beam-forming application, or antennas of a multi-antenna arrangement, or multiple-input multiple-output (MIMO) streams.

11. The method of claim 1, wherein the reference signal blocks comprise one or more of: uplink reference signals, sounding reference signals, demodulation reference signals, and phase tracking reference signals.

12. The method of claim 1, further comprising selecting a spatial resource based on spatial resources which have been determined to be considered for spatial resource selection, wherein selecting a spatial resource comprises one or more of:
selecting one of the spatial resources which have been determined to be considered for spatial resource selection; and
selecting a spatial resource which is a combination of two or more of the spatial resources which have been determined to be considered for spatial resource selection.

13. A computer program product comprising a non-transitory computer readable medium, having thereon a computer program comprising program instructions, the computer program being loadable into a data processing unit and configured to cause execution of the method according to claim 1 when the computer program is run by the data processing unit.

14. An apparatus for spatial resource selection from a plurality of spatial resources, the apparatus comprising controlling circuitry configured to cause, for each spatial resource of the plurality of spatial resources:

reception of a plurality of reference signal blocks using the spatial resource, wherein reception of at least some of the reference signal blocks are in different frequency intervals and during different time intervals;

determination, for each received reference signal block, of whether or not a signal quality metric of the received reference signal block meets a quality criterion; and determination of whether the spatial resource is to be considered for spatial resource selection based on the quality criterion determinations of the received reference signal blocks, wherein determination of whether the spatial resource is to be considered for spatial resource selection comprises determining that the spatial resource is to be considered for spatial resource selection when the quality criterion is met for at least a first number of the plurality of received reference signal blocks.

* * * * *